(12) United States Patent
Yan et al.

(10) Patent No.: US 8,517,245 B1
(45) Date of Patent: Aug. 27, 2013

(54) AUTOMATIC SOLDERING MACHINE

(75) Inventors: Ai-Jun Yan, Guang-Dong (CN); Wei Wang, Guang-Dong (CN); Wen-Zhi Xia, Guang-Dong (CN)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/448,621

(22) Filed: Apr. 17, 2012

(51) Int. Cl.
*B23K 37/00* (2006.01)

(52) U.S. Cl.
USPC .............. 228/4.5; 228/6.2; 228/33; 228/47.1; 228/49.5

(58) Field of Classification Search
None
See application file for complete search history.

(56) References Cited

U.S. PATENT DOCUMENTS

| | | | | |
|---|---|---|---|---|
| 2,759,161 A | * | 8/1956 | Berg | 439/424 |
| 3,585,346 A | * | 6/1971 | Jackson | 219/85.19 |
| 3,889,364 A | * | 6/1975 | Krueger | 29/854 |
| 3,940,046 A | * | 2/1976 | Fern | 228/8 |
| 3,953,925 A | * | 5/1976 | Wilson | 29/866 |
| 4,220,845 A | * | 9/1980 | Morreale | 219/243 |
| 4,790,067 A | * | 12/1988 | Grindle | 29/748 |
| 5,802,711 A | * | 9/1998 | Card et al. | 29/840 |
| 5,911,354 A | * | 6/1999 | Chou | 228/6.2 |
| 6,400,397 B1 | * | 6/2002 | Maurel | 348/87 |
| 8,011,557 B1 | * | 9/2011 | Zhang et al. | 228/4.5 |
| 2006/0035531 A1 | * | 2/2006 | Ngo | 439/701 |
| 2007/0057018 A1 | * | 3/2007 | Kawaguchi | 228/101 |

FOREIGN PATENT DOCUMENTS

| | | | | |
|---|---|---|---|---|
| CN | 102294536 A | * | 12/2011 | |
| JP | 56-114573 A | * | 9/1981 | |
| JP | 60-177587 A | * | 9/1985 | |

* cited by examiner

*Primary Examiner* — Kiley Stoner
(74) *Attorney, Agent, or Firm* — Cheng-Ju Chiang (57) ABSTRACT

An automatic soldering machine adapted for soldering cables with electronic products includes a main frame module, a man-machine control interface, a sliding tray located in front of the man-machine control interface, a loading tool slidably disposed in the sliding tray, a feeding module close to a bottom of the sliding tray, a removing module located between the man-machine control interface and a reforming module, a container, a loading tool combination module located above the sliding tray, a spraying module located in rear of the sliding tray, and a loading tool reflow module mounted on a rear of the main frame module. The man-machine control interface is connected with and controls the loading tool, the feeding module, the removing module, the reforming module, the loading tool combination module, the spraying module and the loading tool reflow module for realizing an automatic soldering process of the electronic products and the cables.

19 Claims, 9 Drawing Sheets

AUTOMATIC SOLDERING MACHINE

BACKGROUND OF THE INVENTION

1. Field of the Invention

The present invention generally relates to an automatic soldering machine, and more particularly to an automatic soldering machine with a spraying solder function.

2. The Related Art

Generally, a cable is connected with an electronic product by means of soldering core wires of the cable with terminals of the electronic product. A usual operation procedure of soldering the core wires of the cable with the terminals of the electronic product is described as follows. At first, a portion of an insulator of the cable is stripped manually to expose the core wires. Then, a soldering gun is used for soldering the core wires of the cable with the terminals of the electronic product manually in a way of single point soldering. However, the aforesaid operation procedure of soldering the core wires of the cable with the terminals of the electronic product is executed by operators that often affects quality of soldering the cable with the terminals and even brings defects of false soldering, nonuniform soldered points and so on. Furthermore, the operators need be trained for a long time that causes a higher manufacture cost, and it is so slow for the operators to manually execute the soldering process that it often fails to meet a mass manufacture requirement.

SUMMARY OF THE INVENTION

An object of the present invention is to provide an automatic soldering machine adapted for soldering cables with electronic products having soldering portions. The automatic soldering machine includes a main frame module, a man-machine control interface, a sliding tray, a loading tool, a feeding module, a removing module, a reforming module, a container, a loading tool combination module, a spraying module and a loading tool reflow module. The man-machine control interface is mounted on one side of the main frame module. The sliding tray is mounted on the main frame module and is located in front of the man-machine control interface. The loading tool is slidably disposed in the sliding tray. The loading tool includes a product loading body for loading the electronic products therein, and a cable loading body for loading the cables therein. The feeding module is disposed on the main frame module and is close to a bottom of the sliding tray for transmitting the cable loading body together with the cables to the removing module and the reforming module in sequence. The removing module is mounted on the one side of the main frame module for cutting head ends of the cables and stripping insulators of the head ends of the cables to expose core wires of the cables outside. The reforming module is mounted on the one side of the main frame module with the removing module being located between the man-machine control interface and the reforming module. The reforming module modulates the core wires of the cables to a certain angle for making the core wires of the cables close to the soldering portions of the electronic products. The container is mounted on the other side of the main frame module for providing scaling powder. The loading tool combination module is mounted on the main frame module, and is located above the sliding tray. The loading tool combination module includes a brushing mechanism for brushing the scaling powder on the soldering portions of the electronic products, then the loading tool combination module combining the cable loading body and the product loading body together. The spraying module is mounted on the main frame module, and is located in rear of the sliding tray for spraying hot molten solder to solder the core wires of the cables with the soldering portions of the electronic products. The loading tool reflow module is mounted on a rear of the main frame module. The loading tool reflow module includes a loading platform where the product loading body and the cable loading body are taken apart to take out finished goods, then the cable loading body and the product loading body reflowing back by the loading tool reflow module. The man-machine control interface is connected with and controls the loading tool, the feeding module, the removing module, the reforming module, the loading tool combination module, the spraying module and the loading tool reflow module for realizing an automatic soldering process of the electronic products and the cables.

As described above, the automatic soldering machine controls the loading tool by means of the man-machine control interface to make the automatic soldering machine proceed a series of manufacturing operations, such as the spraying hot molten solder operation, on the electronic products and the cables for realizing the automatic soldering process of the electronic products and the cables so as to replace a single point soldering way which is widely used in skilled field. As a result, the automatic soldering machine has a higher manufacture efficiency and the finished goods have a stable quality so as to meet a mass manufacture requirement.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
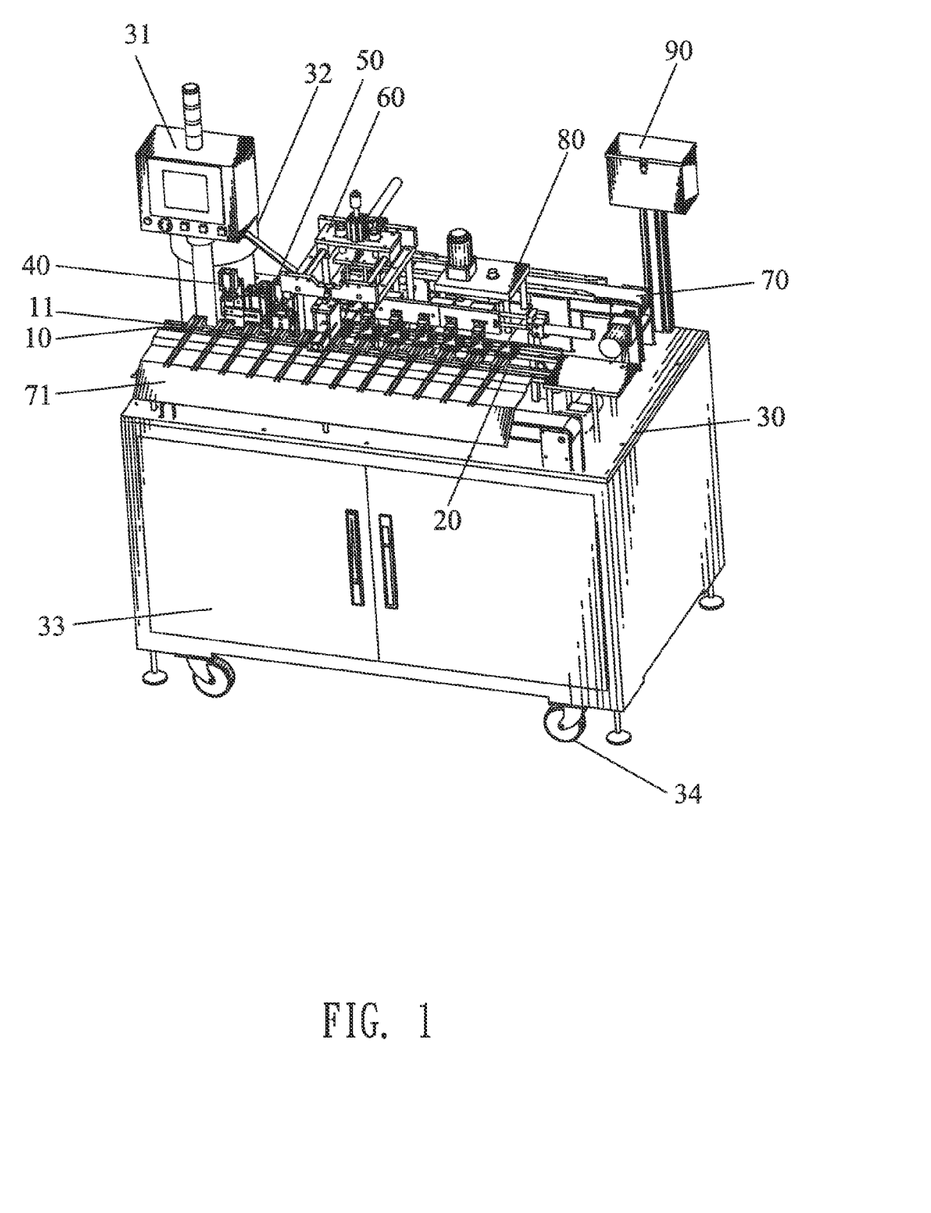
FIG. 1 is a perspective view of an automatic soldering machine in accordance with the present invention.
Figure 2:
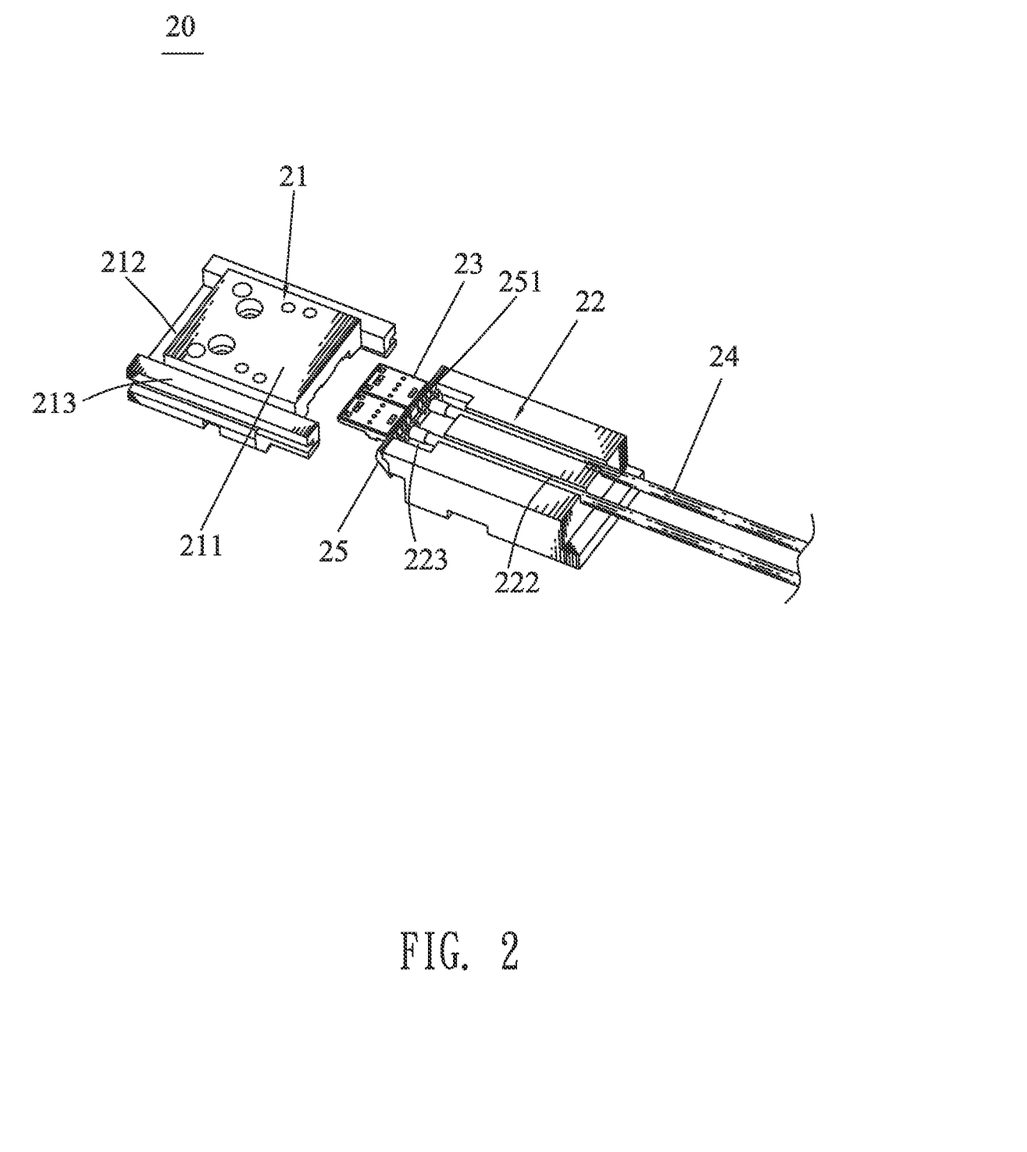
FIG. 2 is a perspective view of a loading tool of the automatic soldering machine of FIG. 1, wherein electronic products and cables are loaded in the loading tool.

With reference to FIG. 1 and FIG. 2, an automatic soldering machine in accordance with the present invention is shown. The automatic soldering machine adapted for soldering cables 24 with electronic products 23 having soldering portions (not labeled) includes a loading tool 20, a main frame module 30, a man-machine control interface 31, a sliding tray 10, a feeding module 11, a removing module 40, a reforming module 50, a container 90, a loading tool combination module 60, a spraying module 80 and a loading tool reflow module 70.

The man-machine control interface 31 is mounted on one side of the main frame module 30. The sliding tray 10 is mounted on the main frame module 30, and is located in front of the man-machine control interface 31. The loading tool 20 is slidably disposed in the sliding tray 10 and includes a product loading body 21 for loading the electronic products 23 therein, and a cable loading body 22 for loading the cables 24 therein. The feeding module 11 is disposed on the main frame module 30 and is close to a bottom of the sliding tray 10 for transmitting the cable loading body 22 together with the cables 24 to the removing module 40 and the reforming module 50 in sequence. The removing module 40 is mounted on the one side of the main frame module 30 for cutting head ends of the cables 24 and stripping insulators of the head ends of the cables 24 to expose core wires of the cables 24 outside. The removing module 40 is located apart from the man-machine control interface 31 and is located adjacent to the sliding tray 10. The reforming module 50 is mounted on the one side of the main frame module 30 with the removing module 40 being located between the man-machine control interface 31 and the reforming module 50. The container 90 is mounted on the other side of the main frame module 30 for providing scaling powder. The loading tool combination module 60 is mounted on the main frame module 30, and is located above the sliding tray 10. The spraying module 80 is mounted on the main frame module 30, and is located in rear of the sliding tray 10 for spraying hot molten solder to solder the core wires of the cables 24 with the soldering portions of the electronic products 23. The loading tool reflow module 70 is mounted on a rear of the main frame module 30. The man-machine control interface 31 is connected with and controls the loading tool 20, the feeding module 11, the removing module 40, the reforming module 50, the loading tool combination module 60, the spraying module 80 and the loading tool reflow module 70 for realizing an automatic soldering process of the electronic products 23 and the cables 24.

Referring to FIG. 2, the product loading body 21 has a supporting board 212 disposed horizontally. Two opposite sides of the supporting board 212 protrude upward to form two side boards 213. A protecting cover 211 disposed at a top of the product loading body 21 connects between the two side boards 213 and is spaced from a top of the supporting board 212 for protecting the electronic products 23. A rear end of a top surface of the cable loading body 22 is concaved downward to form an opening 223. The top surface of the cable loading body 22 defines two locating slots 222 extending longitudinally to communicate with the opening 223 and pass through a front end edge thereof. A cable divider 25 is connected with a rear end surface of the cable loading body 22. A middle of the cable divider 25 is divided into a plurality of fixing slots 251 connecting between the opening 223 and an external space of the cable loading body 22. The electronic products 23 are positioned between the supporting board 212 and the protecting cover 211. The protecting cover 211 is capable of preventing the electronic products 23 from being scalded. The cables 24 are located in the locating slot 222 with rear portions thereof projecting into the opening 223 of the cable loading body 22. When the product loading body 21 is engaged with the cable loading body 22, the core wires of the cables 24 and the soldering portions of the electronic products 23 are fixed in the fixing slots 251 to make the core wires of the cables 24 corresponding to the soldering portions of the electronic products 23.

Figure 3:
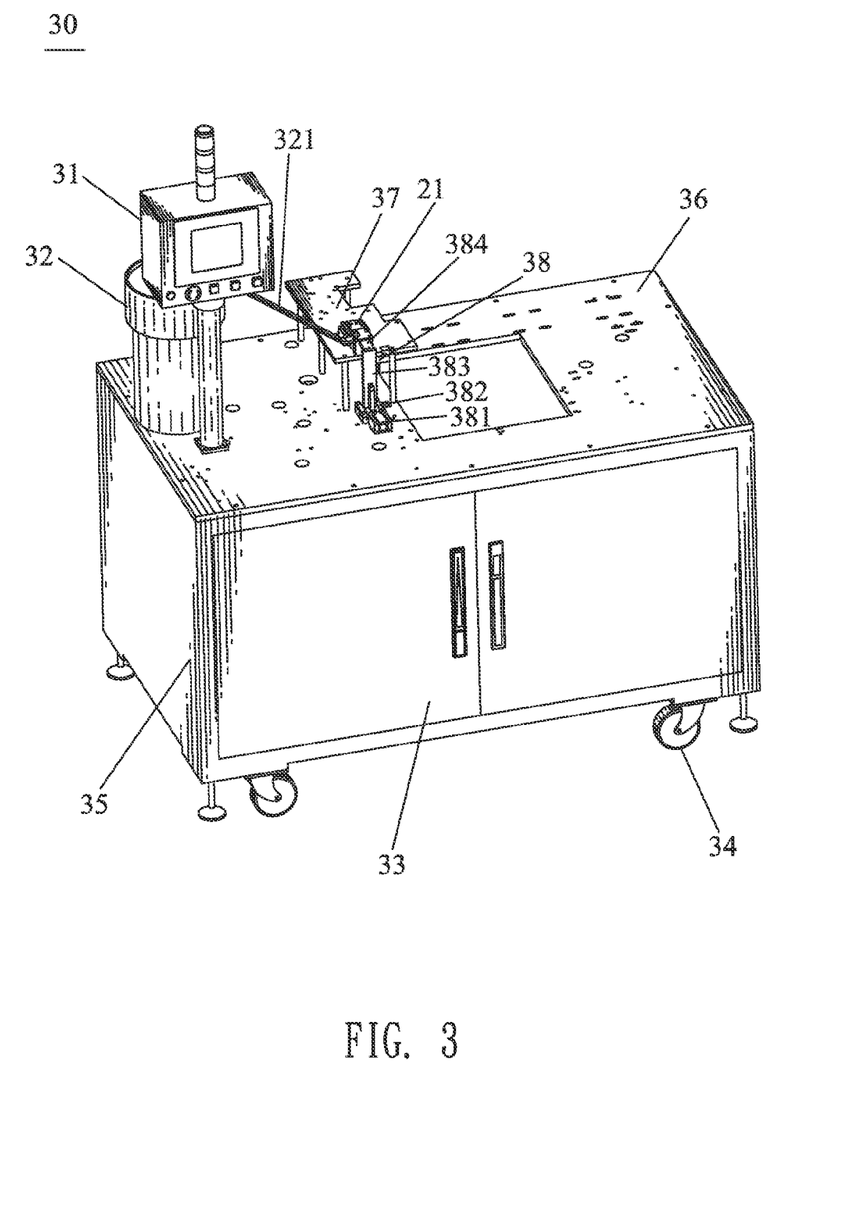
FIG. 3 is a perspective view of a main frame module of the automatic soldering machine of FIG. 1.

Referring to FIG. 1, FIG. 2 and FIG. 3, the main frame module 30 includes an equipment cabinet 35, a vibrating plate 32, a feeding tray 321, a supporting frame 37 and an automatic load module 38. The feeding tray 321 is used for transmitting the electronic products 23. The equipment cabinet 35 has a partingdoor 33 located at a front thereof for putting finished goods (not shown) in the equipment cabinet 35 conveniently, and has a plurality of universal trundles 34 mounted to a bottom thereof to make the equipment cabinet 35 movable so as to facilitate for operating flexibly. A top surface of the equipment cabinet 35 is horizontal to be designated as a panel 36. The man-machine control interface 31 is mounted on one side of the panel 36 of the equipment cabinet 35. The vibrating plate 32 is mounted on the panel 36 of the equipment cabinet 35 and located in rear of the man-machine control interface 31. The supporting frame 37 is mounted on the one side of the panel 36 of the equipment cabinet 35 and spaced from the man-machine control interface 31 and the vibrating plate 32. The automatic load module 38 includes a load cylinder 381 mounted on the panel 36 of the equipment cabinet 35 and disposed in front of the supporting frame 37, a sliding trough 382 disposed between the load cylinder 381 and the supporting frame 37, a load piece 384 disposed on the supporting frame 37, and a connecting piece 383 disposed between the sliding trough 382 and the load piece 384. The sliding trough 382 is slidably disposed on the panel 36 of the equipment cabinet 35. The product loading body 21 of the loading tool 20 is disposed on the supporting frame 37 in accordance with the load piece 384. One end of the feeding tray 321 is connected with the vibrating plate 32 and the other end of the feeding tray 321 is connected between the product loading body 21, and the load piece 384 of the automatic load module 38. The feeding tray 321 is fastened to the loading tool 20 by means of the supporting frame 37. The vibrating plate 32 vibrates to transmit the electronic products 23 in the feeding tray 321 to a product load material entrance of the automatic load module 38. The load cylinder 381 drives the load piece 384 to push the electronic products 23 into the product loading body 21 through the connecting piece 383 so as to realize an automatic operation by means of an air pressure pushing effect of the load cylinder 381.

Figure 4:
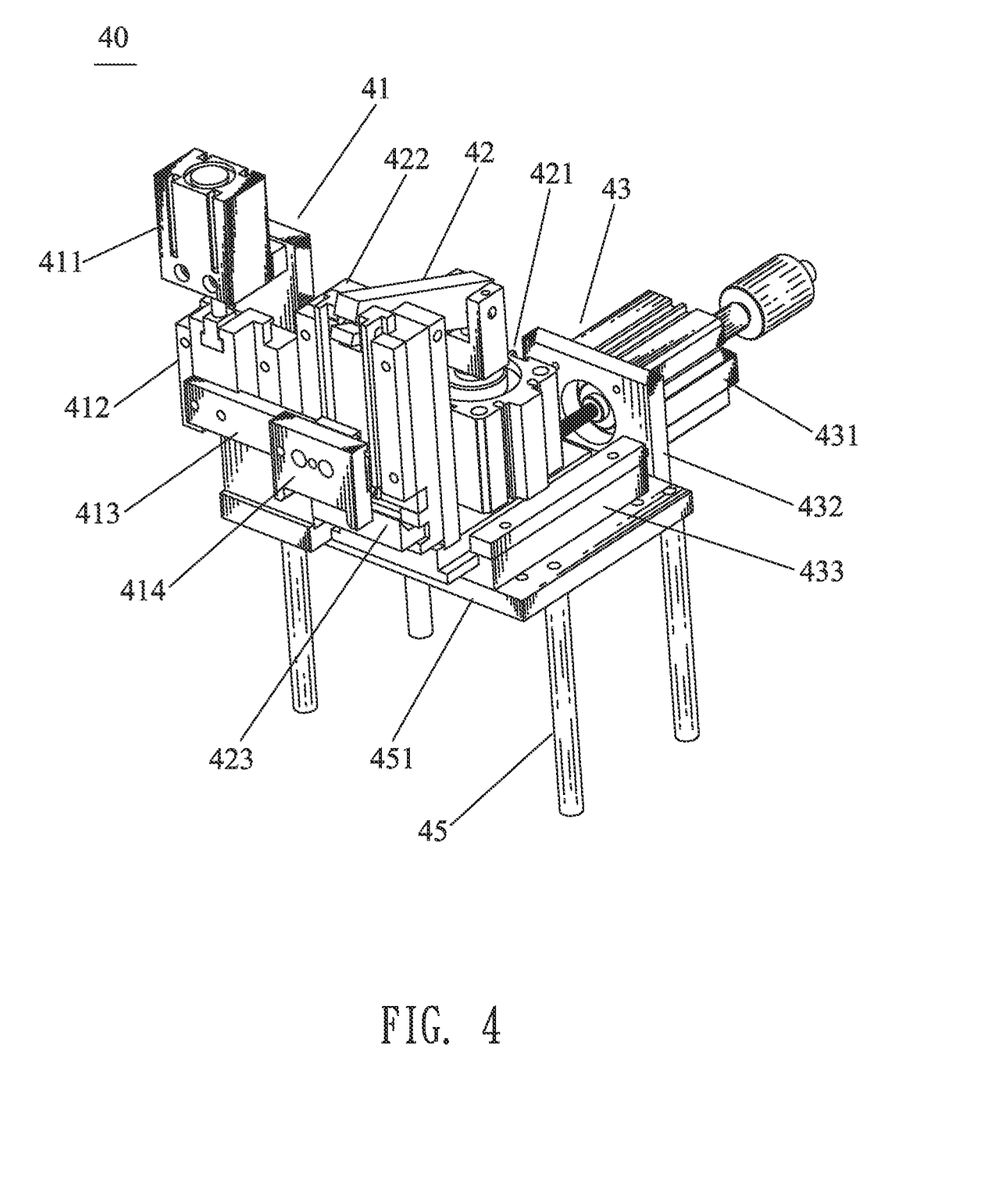
FIG. 4 is a perspective view of a removing module of the automatic soldering machine of FIG. 1.

Referring to FIG. 1, FIG. 2 and FIG. 4, the removing module 40 includes a propping frame 45, a locating mechanism 41, a cutting mechanism 42 and a stripping mechanism 43. The propping frame 45 has a propping board 451 at a top thereof. The locating mechanism 41 is positioned on one side of the propping board 451 of the propping frame 45. The stripping mechanism 43 is positioned on the other side of the propping board 451 of the propping frame 45. The cutting mechanism 42 is positioned between the locating mechanism 41 and the stripping mechanism 43. The locating mechanism 41 includes a locating block 414, a connecting pole 413, a connecting block 412 and a locating cylinder 411. One end of the connecting pole 413 is connected with the connecting block 412. A cylinder pole of the locating cylinder 411 is connected with the connecting block 412 to make the cylinder pole of the locating cylinder 411 connect with the connecting pole 413 indirectly. The other end of the connecting pole 413 is connected with the locating block 414. The locating cylinder 411 pushes the connecting block 412, and then drives the locating block 414 through the connecting pole 413 to locate the cable loading body 22 together with the cables 24 in the locating mechanism 41. The cutting mechanism 42 includes a cutting cylinder 421, a transmission mechanism 422 and a cutting knife 423. The transmission mechanism 422 and the cutting cylinder 421 drive an upper portion and a lower portion of the cutting knife 423 to be engaged with each other for cutting the head ends of the cables 24. The stripping mechanism 43 includes a guiding trough 433, a removing board 432 and a removing cylinder 431. The cutting mechanism 42 is slidably disposed in the guiding trough 433. The removing board 432 is fastened to the propping frame 45 and located in front of the removing cylinder 431. A cylinder pole of the removing cylinder 431 is connected with the cutting mechanism 42. The removing cylinder 431 pushes the cutting mechanism 42 to drive the cutting knife 423 to strip the insulators of the head ends of the cables 24 to expose the core wires of the cables 24 outside.

Figure 5:
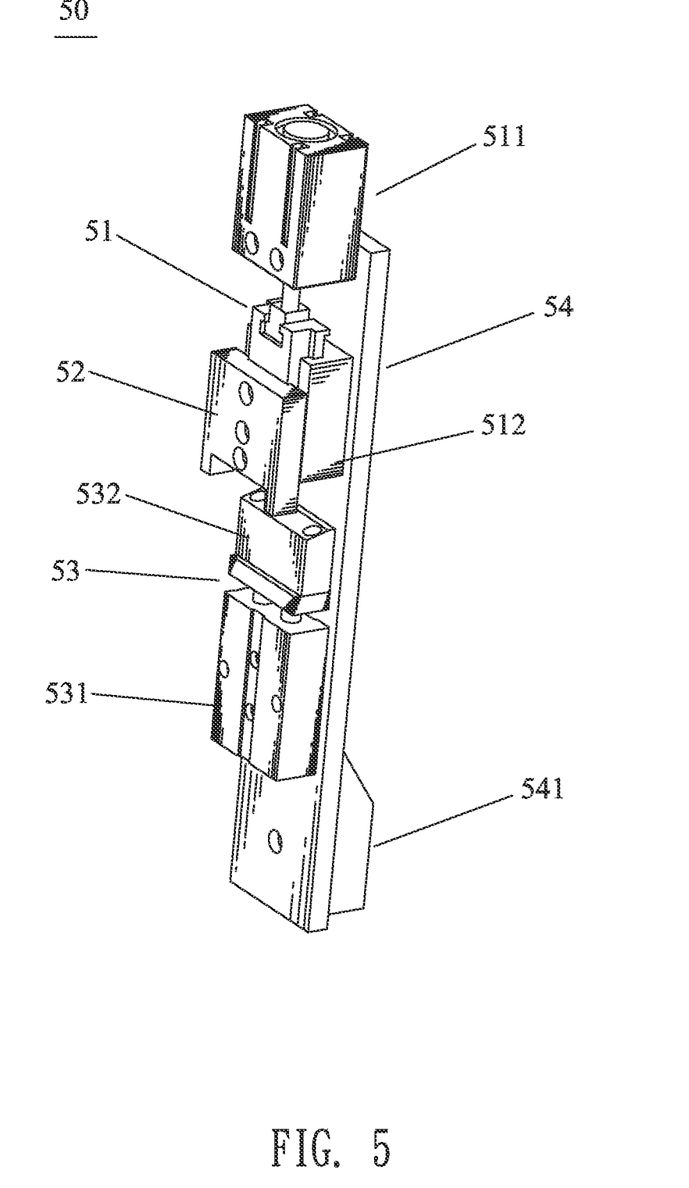
FIG. 5 is a perspective view of a reforming module of the automatic soldering machine of FIG. 1.

Referring to FIG. 1, FIG. 2 and FIG. 5, the reforming module 50 includes a reforming location mechanism 51, a reforming location block 52, a reforming mechanism 53 and a reforming fastening board 54. The reforming location mechanism 51 includes an upper location cylinder 511, and a reforming sliding block 512 connecting with a bottom end of a cylinder pole of the upper location cylinder 511. The reforming mechanism 53 includes a lower reforming cylinder 531, and a reforming knife 532 connecting with top ends of cylinder poles of the lower reforming cylinder 531. The reforming location mechanism 51 is fastened to an upper portion of a front side of the reforming fastening board 54. The reforming mechanism 53 is fastened to a lower portion of the front side of the reforming fastening board 54. The reforming sliding block 512 is slidably connected with the reforming location block 52 to make the cylinder pole of the upper location cylinder 511 connect with the reforming location block 52 indirectly. The upper location cylinder 511 pushes the reforming sliding block 512 to drive the reforming location block 52 to locate the cables 24. The lower reforming cylinder 531 pushes the reforming knife 532 to modulate relative angles of the core wires of the cables 24 to a certain angle for making the core wires of the cables 24 close to the soldering portions of the electronic products 23. A reforming board 541 is fastened to a rear side of the reforming fastening board 54 to fasten to the main frame module 30.

Figure 6:
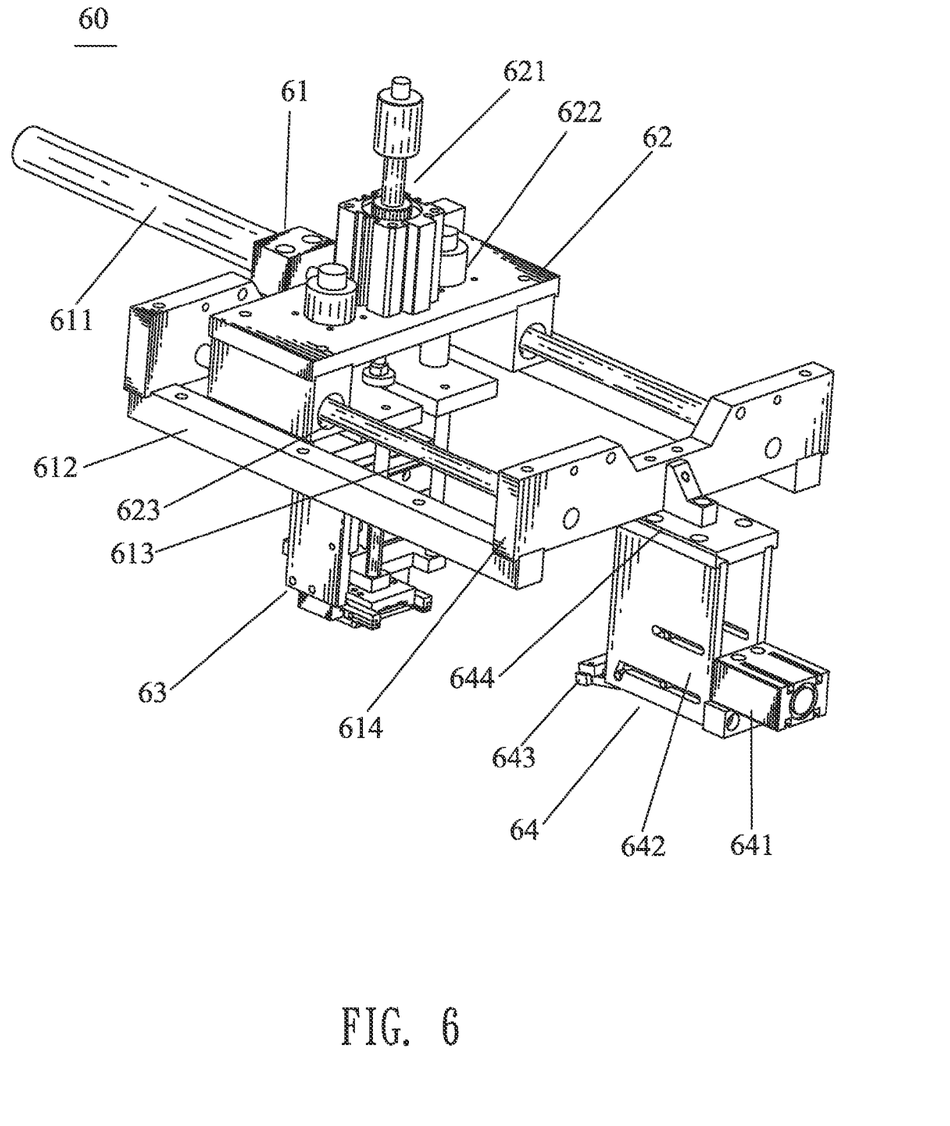
FIG. 6 is a perspective view of a loading tool combination module of the automatic soldering machine of FIG. 1.

Referring to FIG. 1, FIG. 2 and FIG. 6, the loading tool combination module 60 includes a displacement mechanism 61, an elevating mechanism 62, a loading mechanism 63 and a brushing mechanism 64. The displacement mechanism 61 includes a displacement frame 612, a pair of displacement guide rods 613 and a displacement cylinder 611. The elevating mechanism 62 includes a location slider 622, and an elevating cylinder 621. Two opposite sides of the location slider 622 defines two sliding holes 623. The brushing mechanism 64 includes a brushing cylinder 641, a brushing head 643 and a rectangular hollow brushing frame 642. A middle of the rectangular hollow brushing frame 642 passes through a front wall of the brushing frame 642. The displacement guide rods 613 slidably pass through the two sliding holes 623 of the location slider 622 to mount the elevating mechanism 62 to the displacement mechanism 61 slidably. A cylinder pole of the displacement cylinder 611 is connected with a rear of the location slider 622 of the elevating mechanism 62. The two displacement guide rods 613 are mounted to two opposite sides of the displacement frame 612. The location slider 622 of the elevating mechanism 62 is connected between the elevating cylinder 621 and the loading mechanism 63. A cylinder pole of the elevating cylinder 621 passes through the location slider 622 to connect with the loading mechanism 63 so that the elevating cylinder 621 drives the loading mechanism 63 to ascend or descend. The displacement cylinder 611 drives the elevating mechanism 62 together with the loading mechanism 63 to slide forward or rearward along the displacement guide rods 613. The brushing mechanism 64 is mounted to a bottom of a front of the displacement frame 612 and is parallel to the loading mechanism 63. The displacement mechanism 61 and the elevating mechanism 62 can transmit the product loading body 21 and the cable loading body 22 to a position where the product loading body 21 and the cable loading body 22 are ready for being assembled. The brushing cylinder 641 is mounted to a front periphery of the brushing frame 642 with a cylinder pole thereof passing through a rear wall of the brushing frame 642. The brushing head 643 is mounted to a rear of the brushing frame 642 and is connected with the cylinder pole of the brushing cylinder 641. The brushing cylinder 641 drives the brushing head 643 to brush the scaling powder on the soldering portions of the electronic products 23.

Referring to FIG. 1, FIG. 2, FIG. 6 and FIG. 9, the container 90 includes a rectangular box 91, a pipeline (not shown), and a supporting portion 95 supporting the box 91. The box 91 has a box body 911 and a top cover 912 covered on a top of the box body 911. A lock 93 is disposed between one side of the top cover 912 and one side of the box body 911 for combining the top cover 912 and the box body 911 tightly. A bottom of the box 91 defines a ball valve 94. The box 91 of the container 90 is designed as the top cover 912 covering on the box body 911 for the convenience of storing the scaling powder in the container 90 and protecting the scaling powder effectively. The pipeline is connected between the ball valve 94 and the brushing head 643 of the brushing mechanism 64 of the loading tool combination module 60. The container 90 transports the scaling powder to the brushing head 643 of the brushing mechanism 64 through the pipeline to realize a simple and convenient transportation process. The ball valve 94 of the container 90 is capable of controlling a transportation quantity of the scaling powder so as to ensure a uniform and appropriate quantity of the scaling powder is brushed on the soldering portions of the electronic products 23.

Figure 8:
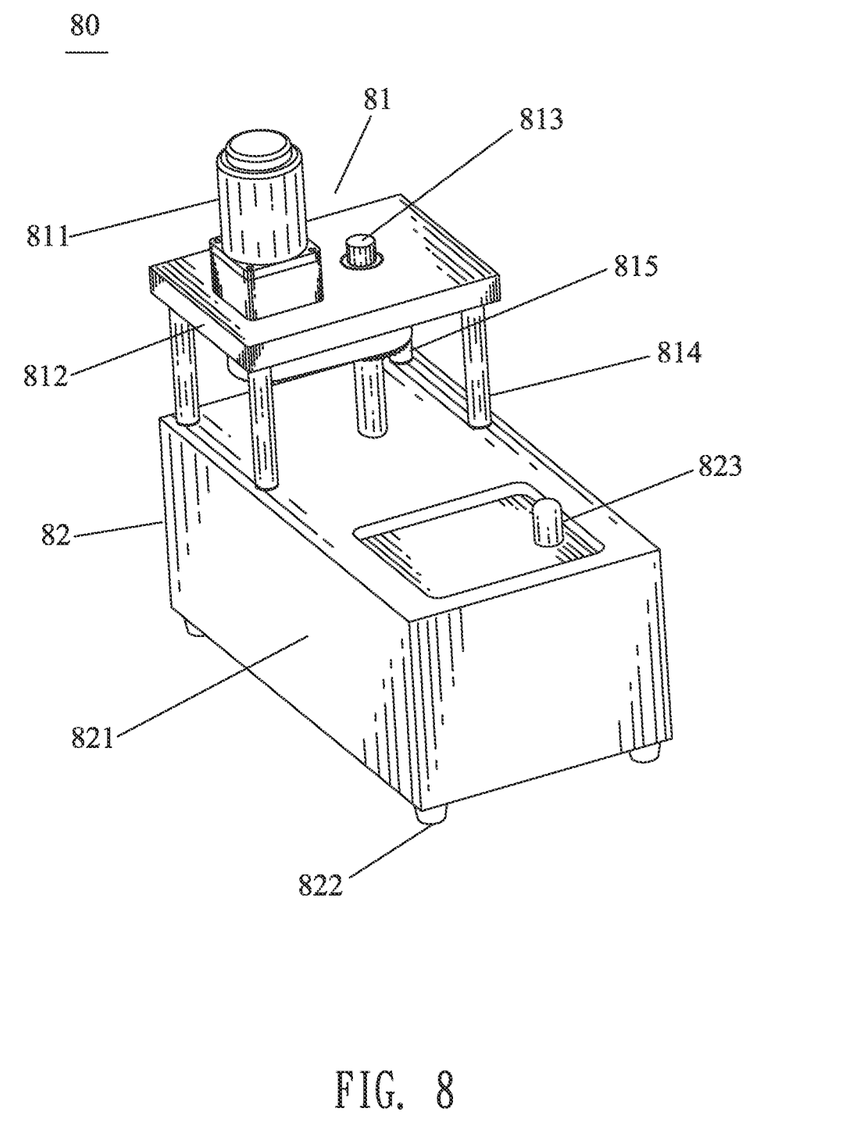
FIG. 8 is a perspective view of a spraying module of the automatic soldering machine of FIG. 1.
Figure 9:
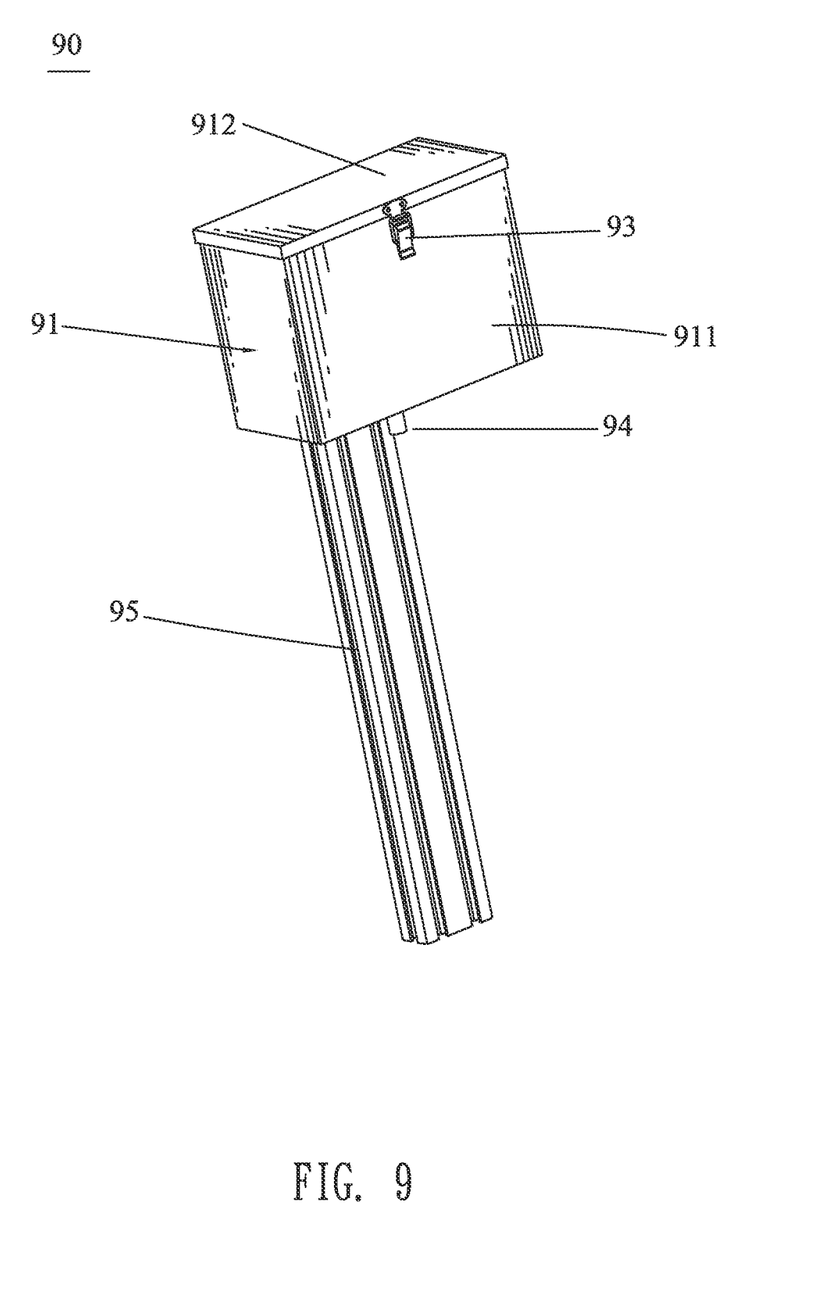
FIG. 9 is a perspective view of a container of the automatic soldering machine of FIG. 1.

Referring to FIG. 1, FIG. 2 and FIG. 8, the spraying module 80 includes a driving mechanism 81 and a solder oven 82. The driving mechanism 81 is disposed on one end of a top surface of the solder oven 82. The other end of the top surface of the solder oven 82 defines a rectangular recess (not shown). A periphery and a bottom of the solder oven 82 is equipped with heating plates 821 to make the solder in the solder oven 82 keep hot molten status. Two pairs of quakeproof cushions 822 are disposed to four corners of the bottom of the solder oven 82 so as to ensure a stability of the solder oven 82. A nozzle 823 is disposed in the recess of the solder oven 82 to provide the hot molten solder sprayed from the nozzle 823 for the core wires of the cables 24 and the soldering portions of the electronic products 23 conveniently, and some splashed hot molten solder is left in the recess. The driving mechanism 81 includes a driving motor 811, a fixing board 812, a driving axis 813, a plurality of columns 814 and a driving belt 815. The driving motor 811 is disposed to the fixing board 812 with a bottom thereof passing through the fixing board 812. The driving axis 813 passes through the fixing board 812 and the top surface of the solder oven 82 to connect with an inside of the solder oven 82. The driving motor 811 and the driving axis 813 are spaced from each other. The driving belt 815 links the bottom of the driving motor 811 and a substantial middle of the driving axis 813. The columns 814 are connected between the fixing board 812 and the one end of the top surface of the solder oven 82 to locate the driving mechanism 81 to the one end of the top surface of the solder oven 82. The driving mechanism 81 controls the hot molten status and a spraying quantity of the solder which is in the solder oven 82 under drive actions of the driving motor 811, the driving axis 813 and the driving belt 815 so as to ensure a soldering quality of the core wires of the cables 24 and the soldering portions of the electronic products 23.

Referring to FIG. 1, FIG. 2, FIG. 3, FIG. 7 and FIG. 8, the loading tool reflow module 70 includes a blocking plate 71, a transferring system 72, a grasping system 73, a product loading tool reflowing system 74, a loading platform 75 and a cable loading tool reflowing system 76. The grasping system 73 includes a grasping cylinder 731 and a shifting claw 732.

Figure 7:
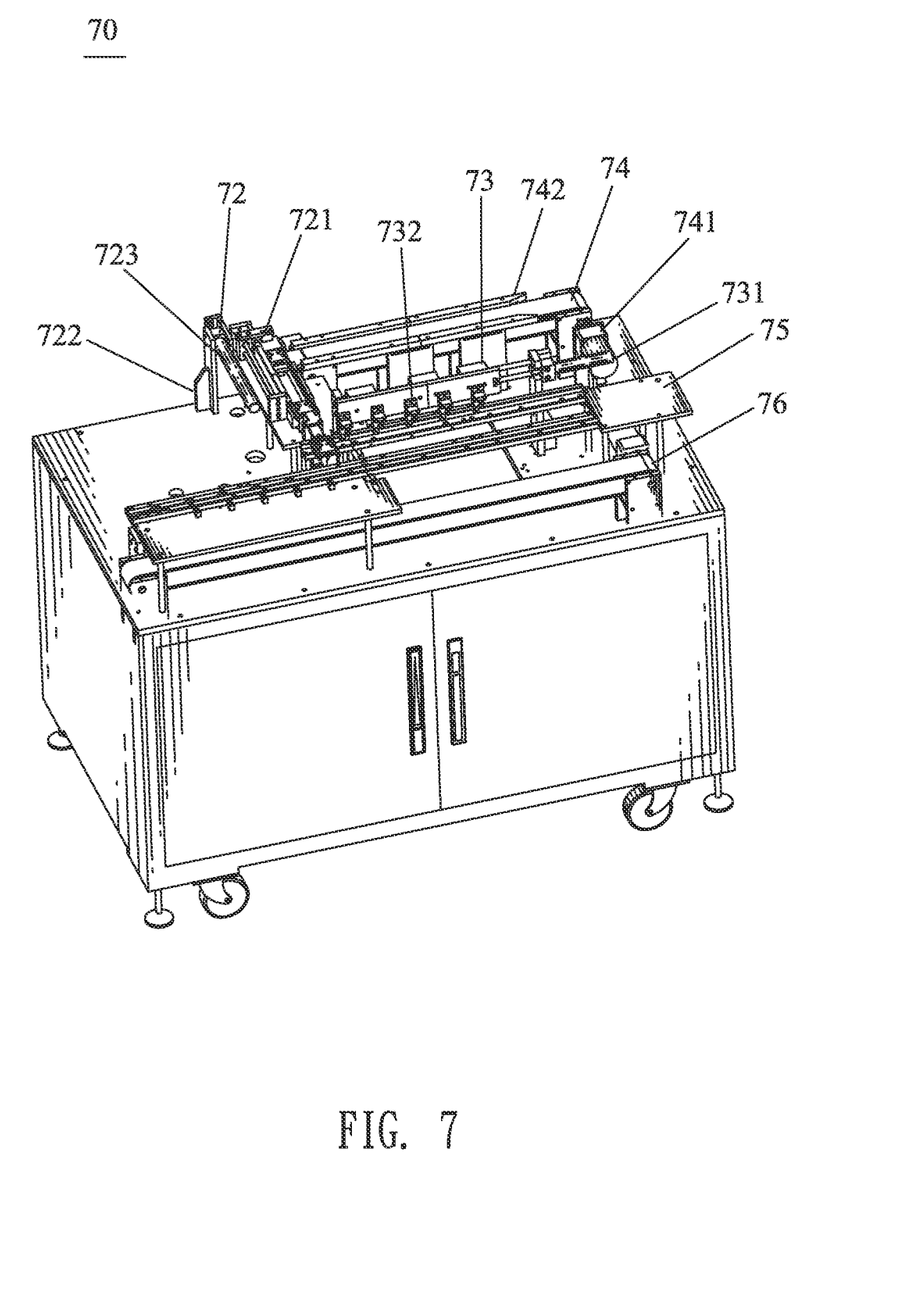
FIG. 7 is a perspective view of a loading tool reflow module of the automatic soldering machine of FIG. 1.

A cylinder pole of the grasping cylinder 731 is connected with the shifting claw 732. The grasping cylinder 731 drives the shifting claw 732 to transfer the loading tool 20 to pass through the solder oven 82, and then transfer the loading tool 20 to the loading platform 75 so as to facilitate for taking apart the product loading body 21 and the cable loading body 22 of the loading tool 20 on the loading platform 75 to take out the finished goods. Then put the product loading body 21 and the cable loading body 22 back to the product loading tool reflowing system 74 and the cable loading tool reflowing system 76 to recycle the product loading body 21 and the cable loading body 22. The product loading tool reflowing system 74 includes a transmitting motor 741 and a transmitting belt 742. After the finished goods are taken out of the loading tool 20 on the loading platform 75, the cable loading body 22 reflows back through the cable loading tool reflowing system 76 of the loading tool reflow module 70 to be reused. Then the product loading body 21 of the loading tool 20 reflows back to the transferring system 72 simply and effectively by virtue of an interaction of the transmitting motor 741 and the transmitting belt 742 of the product loading tool reflowing system 74 of the loading tool reflow module 70. The transferring system 72 includes a transferring block 721, a transferring frame 722 and a transferring cylinder 723. The transferring block 721 and the transferring cylinder 723 are assembled to the transferring frame 722. A cylinder pole of the transferring cylinder 723 is connected with the transferring block 721. The transferring cylinder 723 drives the transferring block 721 to transfer the product loading body 21 to the product load material entrance of the automatic load module 38. The blocking plate 71 is disposed to the cable loading tool reflowing system 76.

Referring to FIGS. 1-9, working principle of the automatic soldering machine is described as follows. At first, put the cables 24 in the locating slots 222 of the cable loading body 22 with the rear portions of the cables 24 project into the opening 223. Then move the cable loading body 22 together with the cables 24 to the sliding tray 10. The feeding module 11 of the automatic soldering machine transmits the cable loading body 22 together with the cables 24 to the removing module 40 by means of controlling the man-machine control interface 31. When the cable loading body 22 together with the cables 24 is arrived at the removing module 40, the locating cylinder 411 pushes the connecting block 412, and then drives the locating block 414 through the connecting pole 413 to locate the cable loading body 22 together with the cables 24 in the locating mechanism 41. The cutting cylinder 421 pushes the transmission mechanism 422 to drive upper portion and lower portion of the cutting knife 423 to be engaged with each other to cut the cables 24. The removing cylinder 431 of the stripping mechanism 43 pushes the cutting mechanism 42 to make the cutting knife 423 strip the insulators of the head ends of the cables 24 to expose the core wires of the cables 24 outside.

After completing cutting the cables 24 and striping the insulators of the head ends of the cables 24, the feeding module 11 transmits the cable loading body 22 together with the cables 24 to the reforming module 50. The upper location cylinder 511 pushes the reforming sliding block 512 to drive the reforming location block 52 to locate the cable loading body 22 together with the cables 24 in the reforming location mechanism 51. The lower reforming cylinder 531 pushes the reforming knife 532 to modulate the core wires of the cables 24 to the certain angle for making the core wires of the cables 24 close to the soldering portions of the electronic products 23. In the meanwhile, the core wires of the cables 24 are fixed in the fixing slots 251. Then the cable loading body 22 together with the cables 24 is transmitted to the loading tool combination module 60. In the meanwhile, the product loading body 21 is transmitted to the product load material entrance of the automatic load module 38 by means of the loading tool reflow module 70. The vibrating plate 32 vibrates to drive the feeding tray 321 to transmit the electronic products 23. The load cylinder 381 pushes the connecting piece 383 to drive the load piece 384 to push the electronic products 23 in the feeding tray 321 into the product loading body 21. After completing loading the electronic products 23, the product loading body 21 together with the electronic products 23 is transmitted to the loading tool combination module 60. When the product loading body 21 together with the electronic products 23, and the cable loading body 22 together with the cables 24 are arrived at the loading tool combination module 60, the elevating cylinder 621 drives the location slider 622 together with the loading mechanism 63 to ascend or descend so as to make the loading mechanism 63 load the product loading body 21 and the cable loading body 22 in sequence. The displacement cylinder 611 drives the elevating mechanism 62 together with the loading mechanism 63 to move along the displacement guide rods 613. The displacement mechanism 61 and the elevating mechanism 62 transmits the product loading body 21 together with the electronic products 23, and the cable loading body 22 together with the cables 24 to the position where the product loading body 21 and the cable loading body 22 are ready for being assembled.

The brushing cylinder 641 of the brushing mechanism 64 drives the brushing head 643 of the brushing mechanism 64 to work, and the ball valve 94 of the container 90 transports the scaling powder to the brushing head 643 of the brushing mechanism 64 through the pipeline for brushing the appropriate quantity of the scaling powder on the soldering portions of the electronic products 23, then the loading tool combination module 60 combines the product loading body 21 and the cable loading body 22 together. The soldering portions of the electronic products 23 are fixed in the fixing slots 251 corresponding to the core wires of the cables 24. And the product loading body 21 together with the electronic products 23 and the cable loading body 22 together with the cables 24 are transmitted to the spraying module 80. When the product loading body 21 together with the electronic products 23 and the cable loading body 22 together with the cables 24 are transmitted to the spraying module 80, the driving mechanism 81 drives the solder oven 82 to work under the driving action of the driving motor 811, the driving axis 813 and the driving belt 815 to make the hot molten solder sprayed from the nozzle 823 so as to solder the core wires of the cables 24 with the soldering portions of the electronic products 23. The grasping cylinder 731 drives the shifting claw 732 to transfer the loading tool 20 to pass through the solder oven 82, and then transfer the loading tool 20 to the loading platform 75 so as to facilitate for taking apart the product loading body 21 and the cable loading body 22 to take out the finished goods. The cable loading body 22 reflows back through the cable loading tool reflowing system 76 of the loading tool reflow module 70 to be reused, and the product loading body 21 reflows back to the transferring system 72 by virtue of the interaction of the transmitting motor 741 and the transmitting belt 742 of the product loading tool reflowing system 74 of the loading tool reflow module 70. The transferring cylinder 723 drives the transferring block 721 to transfer the product loading body 21 to the product load material entrance of the automatic load module 38.

As described above, the automatic soldering machine controls the loading tool 20 by means of the man-machine control interface 31 to make the automatic soldering machine proceed a series of manufacturing operations, such as the spraying hot molten solder operation, on the electronic products 23 and the cables 24 for realizing the automatic soldering process of the electronic products 23 and the cables 24 so as to replace a single point soldering way which is widely used in a skilled field. As a result, the automatic soldering machine has a higher manufacture efficiency and the finished goods have a stable quality so as to meet a mass manufacture requirement.

What is claimed is:

1. An automatic soldering machine adapted for soldering cables with electronic products having soldering portions, comprising:
a main frame module;
a man-machine control interface mounted on one side of the main frame module;
a sliding tray mounted on the main frame module and located in front of the man-machine control interface;
a loading tool slidably disposed in the sliding tray, the loading tool including a product loading body for loading the electronic products therein, and a cable loading body for loading the cables therein;
a feeding module disposed on the main frame module and close to a bottom of the sliding tray for transmitting the cable loading body together with the cables to a removing module and a reforming module in sequence;
the removing module mounted on the one side of the main frame module for cutting head ends of the cables and stripping insulators of the head ends of the cables to expose core wires of the cables outside;
the reforming module mounted on the one side of the main frame module with the removing module being located between the man-machine control interface and the reforming module, the reforming module modulating the core wires of the cables to a certain angle for making the core wires of the cables close to the soldering portions of the electronic products;
a container mounted on the other side of the main frame module for providing scaling powder;
a loading tool combination module mounted on the main frame module and located above the sliding tray, the loading tool combination module including a brushing mechanism for brushing the scaling powder on the soldering portions of the electronic products, then the loading tool combination module combining the cable loading body and the product loading body together;
a spraying module mounted on the main frame module, and located in rear of the sliding tray for spraying hot molten solder to solder the core wires of the cables with the soldering portions of the electronic products; and
a loading tool reflow module mounted on a rear of the main frame module, and including a loading platform where the product loading body and the cable loading body are taken apart to take out finished goods, then the cable loading body and the product loading body reflowing back by the loading tool reflow module;
wherein the man-machine control interface is connected with and controls the loading tool, the feeding module, the removing module, the reforming module, the loading tool combination module, the spraying module and the loading tool reflow module for realizing an automatic soldering process of the electronic products and the cables.

2. The automatic soldering machine as claimed in claim 1, wherein a protecting cover is disposed at a top of the product loading body for protecting the electronic product, the cable loading body defines a plurality of fixing slots for fixing the core wires of the cables and the soldering portions of the electronic products which are corresponding to each other.

3. The automatic soldering machine as claimed in claim 1, wherein the main frame module includes an equipment cabinet, a feeding tray for transmitting the electronic products, a vibrating plate, a supporting frame and an automatic load module which are mounted on the equipment cabinet, one end of the feeding tray is connected with the vibrating plate and the other end of the feeding tray is connected between the product loading body and the automatic load module.

4. The automatic soldering machine as claimed in claim 3, wherein the automatic load module includes a load cylinder mounted on the equipment cabinet and disposed in front of the supporting frame, a sliding trough disposed between the load cylinder and the supporting frame, a load piece disposed on the supporting frame, and a connecting piece disposed between the sliding trough and the load piece, the sliding trough is slidably disposed on the equipment cabinet, the product loading body of the loading tool is disposed on the supporting frame in accordance with the load piece, the vibrating plate vibrates to transmit the electronic products in the feeding tray to a product load material entrance of the automatic load module, the load cylinder drives the load piece to push the electronic products into the product loading body through the connecting piece.

5. The automatic soldering machine as claimed in claim 3, wherein the equipment cabinet has a partingdoor located at a front thereof for putting the finished goods therein conveniently, and has a plurality of universal trundles mounted to a bottom thereof to make the equipment cabinet movable.

6. The automatic soldering machine as claimed in claim 1, wherein the removing module includes a propping frame, a locating mechanism, a cutting mechanism and a stripping mechanism, the locating mechanism is positioned on one side of the propping frame, the stripping mechanism is positioned on the other side of the propping frame, the cutting mechanism is positioned between the locating mechanism and the stripping mechanism, the cutting mechanism includes a cutting cylinder, a transmission mechanism and a cutting knife, the transmission mechanism and the cutting cylinder drive the cutting knife for cutting the head ends of the cables.

7. The automatic soldering machine as claimed in claim 6, wherein the locating mechanism includes a locating block, a connecting pole, a connecting block and a locating cylinder, one end of the connecting pole is connected with the connecting block, a cylinder pole of the locating cylinder is connected with the connecting block to make the cylinder pole of the locating cylinder connect with the connecting pole indirectly, the other end of the connecting pole is connected with the locating block, the locating cylinder pushes the connecting block, and then drives the locating block through the connecting pole to locate the cable loading body of the loading tool together with the cables in the locating mechanism.

8. The automatic soldering machine as claimed in claim 6, wherein the stripping mechanism includes a guiding trough, a removing board and a removing cylinder, the removing board is fastened to the propping frame and located in front of the removing cylinder, a cylinder pole of the removing cylinder is connected with the cutting mechanism, the removing cylinder pushes the cutting mechanism to drive the cutting knife to strip the insulators of the head ends of the cables.

9. The automatic soldering machine as claimed in claim 1, wherein the reforming module includes a reforming location mechanism, a reforming location block, a reforming mechanism and a reforming fastening board, the reforming location mechanism fastened to an upper portion of a front side of the reforming fastening board includes an upper location cylinder, and a reforming sliding block connecting with a cylinder pole of the upper location cylinder, the reforming mechanism fastened to a lower portion of the front side of the reforming fastening board includes a lower reforming cylinder, and a reforming knife connecting with cylinder poles of the lower reforming cylinder, the reforming sliding block is slidably connected with the reforming location block, the upper location cylinder pushes the reforming sliding block to drive the reforming location block to locate the cables, the lower reforming cylinder pushes the reforming knife to modulate relative angles of the core wires of the cables for making the core wires of the cables close to the soldering portions of the electronic products.

10. The automatic soldering machine as claimed in claim 1, wherein the loading tool combination module includes a displacement mechanism, an elevating mechanism and a loading mechanism, the displacement mechanism includes a displacement frame, a pair of displacement guide rods and a displacement cylinder, the elevating mechanism includes a location slider and an elevating cylinder, the displacement guide rods slidably pass through the location slider of the elevating mechanism to mount the elevating mechanism to the displacement mechanism slidably, a cylinder pole of the displacement cylinder is connected with the elevating mechanism, the two displacement guide rods are mounted to two opposite sides of the displacement frame, the location slider of the elevating mechanism is connected between the elevating cylinder of the elevating mechanism and the loading mechanism, the displacement cylinder drives the elevating mechanism together with the loading mechanism to slide forward or rearward along the displacement guide rods.

11. The automatic soldering machine as claimed in claim 10, wherein a cylinder pole of the elevating cylinder passes through the location slider to connect with the loading mechanism so that the elevating cylinder drives the loading mechanism to ascend or descend.

12. The automatic soldering machine as claimed in claim 10, wherein the brushing mechanism of the loading tool combination module is mounted to a bottom of a front of the displacement frame and parallel to the loading mechanism, the brushing mechanism includes a brushing cylinder, a brushing head and a brushing frame, the brushing cylinder is mounted to a front periphery of the brushing frame with a cylinder pole thereof passing through a rear wall of the brushing frame, the brushing head is mounted to a rear of the brushing frame and is connected with the cylinder pole of the brushing cylinder, the brushing cylinder drives the brushing head to brush the scaling powder on the soldering portions of the electronic products.

13. The automatic soldering machine as claimed in claim 1, wherein the spraying module includes a driving mechanism and a solder oven, the driving mechanism is disposed on one end of a top surface of the solder oven, the other end of the top surface of the solder oven defines a recess, a periphery and a bottom of the solder oven is equipped with heating plates to make the solder in the solder oven keep hot molten status, a plurality of quakeproof cushions are disposed to the bottom of the solder oven so as to ensure a stability of the solder oven, a nozzle is disposed in the recess of the solder oven to provide the hot molten solder sprayed from the nozzle for the core wires of the cables and the soldering portions of the electronic products conveniently, and some splashed hot molten solder is left in the recess.

14. The automatic soldering machine as claimed in claim 13, wherein the driving mechanism includes a driving motor, a fixing board, a driving axis and a driving belt, the driving motor is disposed to the fixing board with a bottom thereof passing through the fixing board, the driving axis passes through the fixing board and the top surface of the solder oven to connect with an inside of the solder oven, the driving belt links the bottom of the driving motor and a substantial middle of the driving axis, the driving mechanism controls the hot molten status and a spraying quantity of the solder which is in the solder oven under drive actions of the driving motor, the driving axis and the driving belt so as to ensure a soldering quality of the core wires of the cables and the soldering portions of the electronic products.

15. The automatic soldering machine as claimed in claim 13, wherein the loading tool reflow module includes a transferring system, and a grasping system which includes a grasping cylinder and a shifting claw, a cylinder pole of the grasping cylinder is connected with the shifting claw, the grasping cylinder drives the shifting claw to transfer the loading tool to pass through the solder oven, and then transfer the loading tool to the loading platform.

16. The automatic soldering machine as claimed in claim 15, wherein the loading tool reflow module further includes a product loading tool reflowing system, the product loading tool reflowing system includes a transmitting motor and a transmitting belt, the product loading body of the loading tool reflows back to the transferring system by virtue of an interaction of the transmitting motor and the transmitting belt, the transferring system includes a transferring block, a transferring frame and a transferring cylinder, the transferring block and the transferring cylinder are assembled to the transferring frame, a cylinder pole of the transferring cylinder is connected with the transferring block, the transferring cylinder drives the transferring block to transfer the product loading body to a product load material entrance of the automatic load module.

17. The automatic soldering machine as claimed in claim 15, wherein the loading tool reflow module further includes a cable loading tool reflowing system, the cable loading body reflows back through the cable loading tool reflowing system to be reused.

18. The automatic soldering machine as claimed in claim 1, wherein the container includes a box, and a supporting portion supporting the box, the box has a box body and a top cover covered on the box body, a lock is disposed between the top cover and the box body for combining the top cover and the box body tightly, a bottom of the box defines a ball valve capable of controlling a transportation quantity of the scaling powder so as to ensure a uniform and appropriate quantity of the scaling powder is brushed on the soldering portions of the electronic products.

19. The automatic soldering machine as claimed in claim 18, wherein the container further includes a pipeline connected between the ball valve and a brushing head of the brushing mechanism of the loading tool combination module, the container transports the scaling powder to the brushing head of the brushing mechanism through the pipeline.

* * * * *